US010664698B2

(12) United States Patent
Banerjee et al.

(10) Patent No.: US 10,664,698 B2
(45) Date of Patent: May 26, 2020

(54) SIGNAL ANALYSIS SYSTEMS AND METHODS FOR FEATURES EXTRACTION AND INTERPRETATION THEREOF

(71) Applicant: Tata Consultancy Services Limited, Mumbai (IN)

(72) Inventors: Snehasis Banerjee, Kolkata (IN); Tanushyam Chattopadhyay, Kolkata (IN); Ayan Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 299 days.

(21) Appl. No.: 15/900,987

(22) Filed: Feb. 21, 2018

(65) Prior Publication Data

US 2019/0138806 A1    May 9, 2019

(30) Foreign Application Priority Data

Nov. 3, 2017    (IN) .............................. 201721039304

(51) Int. Cl.
*G06K 9/00* (2006.01)
*G06F 16/2455* (2019.01)
(Continued)

(52) U.S. Cl.
CPC ... *G06K 9/00523* (2013.01); *G06F 16/24568* (2019.01); *G06K 9/0051* (2013.01); *G06K 9/6232* (2013.01); *G06N 3/10* (2013.01)

(58) Field of Classification Search
None
See application file for complete search history.

(56) References Cited

U.S. PATENT DOCUMENTS

2007/0098303 A1* 5/2007 Gallagher ............. G06F 16/583
382/305
2008/0030592 A1* 2/2008 Border .................. H04N 5/232
348/218.1

(Continued)

OTHER PUBLICATIONS

Amirah Ismail in a Structured Model Metametadata Technique to Enhance Semantic Searching in Metadata Repository, 7 pages, Jan. 4, 2016 (Year: 2016).*

(Continued)

*Primary Examiner* — Tung S Lau
(74) *Attorney, Agent, or Firm* — Finnegan, Henderson, Farabow, Garrett & Dunner LLP

(57) ABSTRACT

Development of sensor data based descriptive and prescriptive system involves machine learning tasks like classification and regression. Any such system development requires the involvement of different stake-holders for obtaining features. Such features typically obtained are not interpretable for 1-D sensor signals. Embodiments of the present disclosure provide systems and methods that perform signal analysis for features extraction and interpretation thereof wherein input is raw signal data where origin of a feature is traced to signal data, and mapped to domain/application knowledge. Feature(s) are extracted using deep learning network(s) and machine learning (ML) model(s) are implemented for sensor data analysis to perform causality analysis for prognostics. Layer(s) (say last layer) of Deep Network(s) contains the automatically derived features that can be used for ML tasks. Parameter(s) tuning is performed based on the set of features that were recommended by the system to determined performance of systems (or applications) under consideration.

15 Claims, 5 Drawing Sheets

(51) Int. Cl.
*G06K 9/62* (2006.01)
*G06N 3/10* (2006.01)

(56) References Cited

U.S. PATENT DOCUMENTS

| | | | | |
|---|---|---|---|---|
| 2010/0191541 A1* | 7/2010 | Prokoski | ............... | A61B 5/0064 705/2 |
| 2010/0317420 A1* | 12/2010 | Hoffberg | ............ | G06Q 30/0207 463/1 |
| 2012/0242800 A1* | 9/2012 | Ionescu | ................... | G06F 3/017 348/46 |
| 2014/0079297 A1* | 3/2014 | Tadayon | ................. | G06K 9/00 382/118 |
| 2014/0201126 A1* | 7/2014 | Zadeh | ................. | A61B 5/4803 706/52 |
| 2015/0023602 A1* | 1/2015 | Wnuk | ................ | G06K 9/00671 382/190 |
| 2015/0088334 A1* | 3/2015 | Bowers | ................. | G06Q 40/08 701/1 |
| 2015/0141043 A1* | 5/2015 | Abramson | ............ | G01C 21/34 455/456.1 |
| 2015/0211864 A1* | 7/2015 | Carr | ....................... | G01C 21/24 701/519 |
| 2016/0092484 A1* | 3/2016 | Finkler | ............... | G06F 16/2272 707/715 |
| 2016/0337599 A1* | 11/2016 | Williams | .................. | G06T 7/55 |
| 2016/0358099 A1 | 12/2016 | Sturlaugson et al. | | |
| 2017/0278289 A1* | 9/2017 | Marino | ............. | G06K 9/00765 |

OTHER PUBLICATIONS

Hall, P. et al. (Mar. 2017). "Ideas on interpreting machine learning," *O'Reilly*, 81 pages.

Wieloch, M. et al. "Trace-by-Classification: A Machine Learning Approach to Generate Trace Links for Frequently Occurring Software Artifacts," *2013 International Workshop on Traceability in Emerging Forms of Software Engineering*, San Francisco, CA, May 19, 2013; pp. 110-114.

* cited by examiner

SIGNAL ANALYSIS SYSTEMS AND METHODS FOR FEATURES EXTRACTION AND INTERPRETATION THEREOF

PRIORITY CLAIM

This U.S. patent application claims priority under 35 U.S.C. § 119 to: India Application No. 201721039304, filed on Nov. 3, 2017. The entire contents of the aforementioned application are incorporated herein by reference.

TECHNICAL FIELD

The disclosure herein generally relate to data analytics systems, and, more particularly, to signal analysis systems and methods for features extraction and interpretation thereof for recommendations.

BACKGROUND

Development of a sensor data based descriptive and prescriptive system involves machine learning tasks like classification and regression. Any such system development requires the involvement of different stake-holders for understanding the problem domain and generate models for causality analysis, signal processing (SP), machine Learning (ML) techniques to perform data analysis and finally a developer to deploy solution. Now, the problem of developing such a system is that each of the stake holders speaks their own language and terms. In a related survey, it was found that the most difficult task in the above work-flow are, namely feature engineering (a combination of feature listing/extraction and feature selection), and in deep learning approaches such features are not interpretable for 1-D sensor signals and thus are prone to errors when it comes to performing prognostics and activity monitoring.

SUMMARY

Embodiments of the present disclosure present technological improvements as solutions to one or more of the above-mentioned technical problems recognized by the inventors in conventional systems. For example, in one aspect, a processor implemented method for performing data analysis for features extraction and interpretation is provided. The method comprising obtaining, via one or more hardware processors, an input data (e.g., an input signal) from one or more sensors; pre-processing, via the one or more hardware processors, the input data to filter at least one of noise and one or more anomalies and obtain a filtered data; extracting, by using a window based processing technique on the filtered data, a first set of features from the filtered data, wherein each feature from the first set of features is unique and corresponds to one or more domains; applying metadata to the first set of features; generating, using a selection and recommendation system, a second set of features from the first set of features upon applying the metadata; generating one of more feature values for the second set of features based on one or more time instances observed in the window based processing technique; performing, based on a searching on structured knowledge representation methods such as for example, a knowledge graph search, a comparison of the one or more generated features values with one or more corresponding pre-defined domain values; and mapping the one or more generated feature values to one or more corresponding domain specific templates based on the comparison.

In an embodiment, the step of extracting, by using a window based processing technique on the filtered data, a first set of features from the filtered data may comprise analyzing a window size (or frame) associated with each window applied using the window based processing technique; and extracting, by using the analyzed window size, the first set of features associated with each window. In an embodiment, the window size is analysed based on a weighted aggregation of at least one of a domain specified window and a statistically identified window size.

In an embodiment, the method may further comprise tuning the one or more feature values corresponding to each feature from the second set of features to determine performance of each feature in the one or more domains. In an embodiment, the method may further comprise upon applying the window based processing technique, identifying one or more duplicate features from each window; and filtering the one or more duplicate features from the first set of features.

In another aspect, a system for performing data analysis for features extraction and interpretation is provided. The system comprising: a memory storing instructions; one or more communication interfaces; and one or more hardware processors coupled to the memory via the one or more communication interfaces, wherein the one or more hardware processors are configured by the instructions to: obtain an input data from one or more sensors; pre-process the input data to filter at least one of noise and one or more anomalies and obtain a filtered data; extract, by using a window based processing technique on the filtered data, a first set of features from the filtered data, wherein each feature from the first set of features is unique and corresponds to one or more domains; apply metadata to the first set of features; generate, using a selection and recommendation system, a second set of features from the first set of features upon applying the metadata; generate one of more feature values for the second set of features based on one or more time instances observed in the window based processing technique; perform, based on a searching on structured knowledge representation methods such as for example, a knowledge graph search, a comparison of the one or more generated features values with one or more corresponding pre-defined domain values; and map the one or more generated feature values to one or more corresponding domain specific templates based on the comparison.

In an embodiment, the first set of features are extracted from the filtered data by: analyzing a window size (or frame) associated with each window applied using the window based processing technique; and extracting, by using the analyzed window size, the first set of features associated with each window. In an embodiment, the window size is analysed based on a weighted aggregation of at least one of a domain specified window and a statistically identified window size.

In an embodiment, the one or more hardware processors may be further configured to tune the one or more feature values corresponding to each feature from the second set of features to determine performance of each feature in the one or more domains. In an embodiment, upon the window based processing technique being applied on the filtered data, the one or more hardware processors are further configured to identify one or more duplicate features from each window, and filter the one or more duplicate features from the first set of features.

In yet another aspect, one or more non-transitory machine readable information storage mediums comprising one or more instructions is provided. The one or more instructions which when executed by one or more hardware processors causes performing data analysis for features extraction and interpretation thereof by obtaining an input data from one or more sensors; pre-processing, via the one or more hardware processors, the input data to filter at least one of noise and one or more anomalies and obtain a filtered data; extracting, by using a window based processing technique on the filtered data, a first set of features from the filtered data, wherein each feature from the first set of features is unique and corresponds to one or more domains; applying metadata to the first set of features; generating, using a selection and recommendation system, a second set of features from the first set of features upon applying the metadata; generating one of more feature values for the second set of features based on one or more time instances observed in the window based processing technique; performing, based on a searching on structured knowledge representation methods such as for example, a knowledge graph search, a comparison of the one or more generated features values with one or more corresponding pre-defined domain values; and mapping the one or more generated feature values to one or more corresponding domain specific templates based on the comparison.

In an embodiment, the step of extracting, by using a window based processing technique on the filtered data, a first set of features from the filtered signal may comprise analyzing a window size (or a window frame) associated with each window applied using the window based processing technique; and extracting, by using the analyzed window size, the first set of features associated with each window. In an embodiment, the window size is analysed based on a weighted aggregation of at least one of a domain specified window and a statistically identified window size.

In an embodiment, the instructions may further cause tuning the one or more feature values corresponding to each feature from the second set of features to determine performance of each feature in the one or more domains. In an embodiment, the instructions may further cause upon applying the window based processing technique, identifying one or more duplicate features from each window; and filtering the one or more duplicate features from the first set of features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
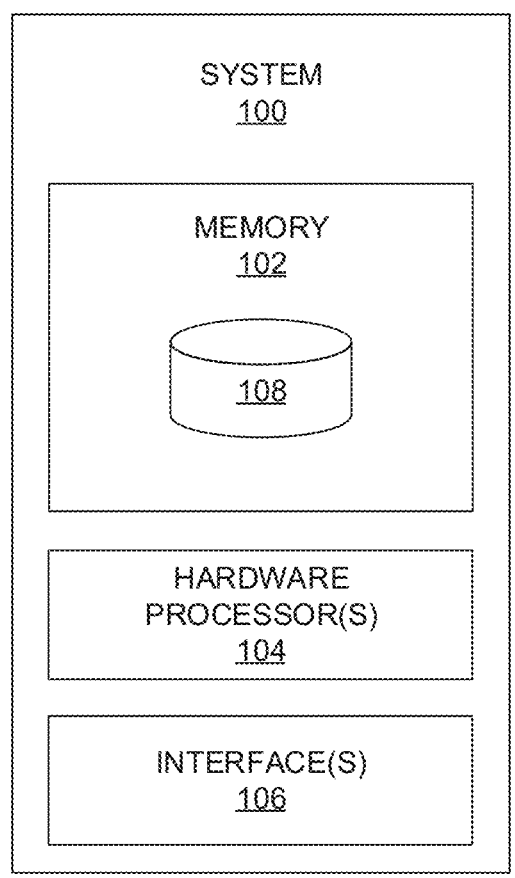
FIG. 1 illustrates an exemplary block diagram of a data analysis system for features extraction from input data and interpretation thereof for recommendations according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Development of a sensor data based descriptive and prescriptive system involves machine learning tasks like classification and regression. Any such system development requires the involvement of different stake-holders for understanding the problem domain and generate models for causality analysis, signal processing (SP), machine Learning (ML) techniques to perform data analysis and finally a developer to deploy solution. Domain expert is required for understanding the problem domain and who can make sense of features of a model for causality analysis, for example, a mechanical engineer of a machine plant in case of machine prognostics, signal processing (SP) expert: who can suggest suitable signal processing algorithms (such as spectrogram) and their corresponding tuning parameters (such as spectrum type and window overlap), Machine Learning (ML) expert: who can perform data analysis and design the models for a ML task such as classification or regression, Coder or developer: who can construct a deployable solution to be used by end users, after other stakeholders have shared inputs.

Now, the problem of developing such a system is that each of the stake holders speaks their own language and terms. The typical work-flow steps for such a sensor data analytics task is as follows: 1. Domain Expert explains the goal of the problem pertaining to the use case and application to the SP and ML resource persons. 2. SP expert provides a list of algorithms that can be used as features (data transforms to make data easy for analysis) for given problem. 3. ML expert recommends the optimal feature set based on analysis of the available dataset and her/his knowledge of similar problems. 4. SP expert tunes the parameters of those algorithms (such as window size, n-point for a Fast Fourier Transform algorithm), and the ML expert tunes the (hyper) parameters to derive a solution model. 5. Recommended feature set is presented to domain expert for validation and verification, to check if extracted features are sound. 6. If current features are meaningless, which is often the case, the steps 2-5 are repeated in iteration with a change in approach and taking into account the domain expert's feedback. 7. Final system with finalized model is deployed by developer. In a related survey, it was found that the most difficult task in the above work-flow is task 2 and 3, namely feature engineering (a combination of feature listing/extraction and feature selection). Step 5 (validation of features by domain experts) is difficult in a Deep Learning based approach as features obtained are not interpretable for 1-D sensor signals. The embodiments of the present disclosure provide systems and methods that depict how to interpret the recommended features for machine prognostics and activity monitoring by using a modified Wide Learning approach.

Embodiments of the present disclosure provide systems and methods that perform signal analysis for features extraction and interpretation thereof. The system implements an approach for interpretable feature recommendation for solving signal data analytics problems. The proposed approach is based on Wide Learning architecture and provides means for interpretation of the recommended features. It is to be noted that such an interpretation is not available with feature learning approaches like Deep Learning (such as Convolutional Neural Network) or feature transformation approaches like Principal Component Analysis. Results show that the feature recommendation and interpretation techniques are quite effective for the problems at hand in terms of performance and drastic reduction in time to develop a solution.

More particularly, the present disclosure describes a system and method for (automation of) sensor signal data analytics suited for classification and regression tasks. It is based on an approach for interpretable feature recommendation as well as feature learning. The method has been tested by performing experiments on data-sets in the domain of prognostics where interpretation of features is considered very important. The proposed approach is based on Wide Learning architecture and provides means for interpretation of the recommended features. Results show that the feature recommendation and interpretation techniques are quite effective for the problems at hand in terms of performance and drastic reduction in time to develop a solution. It is further shown by an example, how this human-in-loop interpretation system can be used as a prescriptive system. The input of the proposed system is raw signal data and output are 1) interpret-able feature set and 2) machine learning model—which in one sense is to automate the sensor data analysis process, in another sense is to do causality analysis for prognostics. It is to be noted and understood to a person having ordinary skill in the art that present disclosure is not restricted or limited to data derived from sensors, but to any variety of data that can be mapped into a signal value oriented format for processing. Also system has inbuilt learning that can be leveraged further based on combination of meta-data and knowledge-base of domain with application.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a data analysis system for features extraction from input data and interpretation thereof for recommendations according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to one or more input data (e.g., input signals) that are received for analysis, extracted features, corresponding metadata, matching templates to store interpretation details for recommendation, etc., tuning information of values associated with features, performance data of each feature, and the like. In an embodiment, the memory 102 may store one or more classifiers (not shown in FIG. 1) and the like, which are implemented by the one or more hardware processors 104 (or by the system 100) to enable learning of the features, evaluate the features, and train the system 100 using the training data to perform the methodology described herein.

Figure 2:
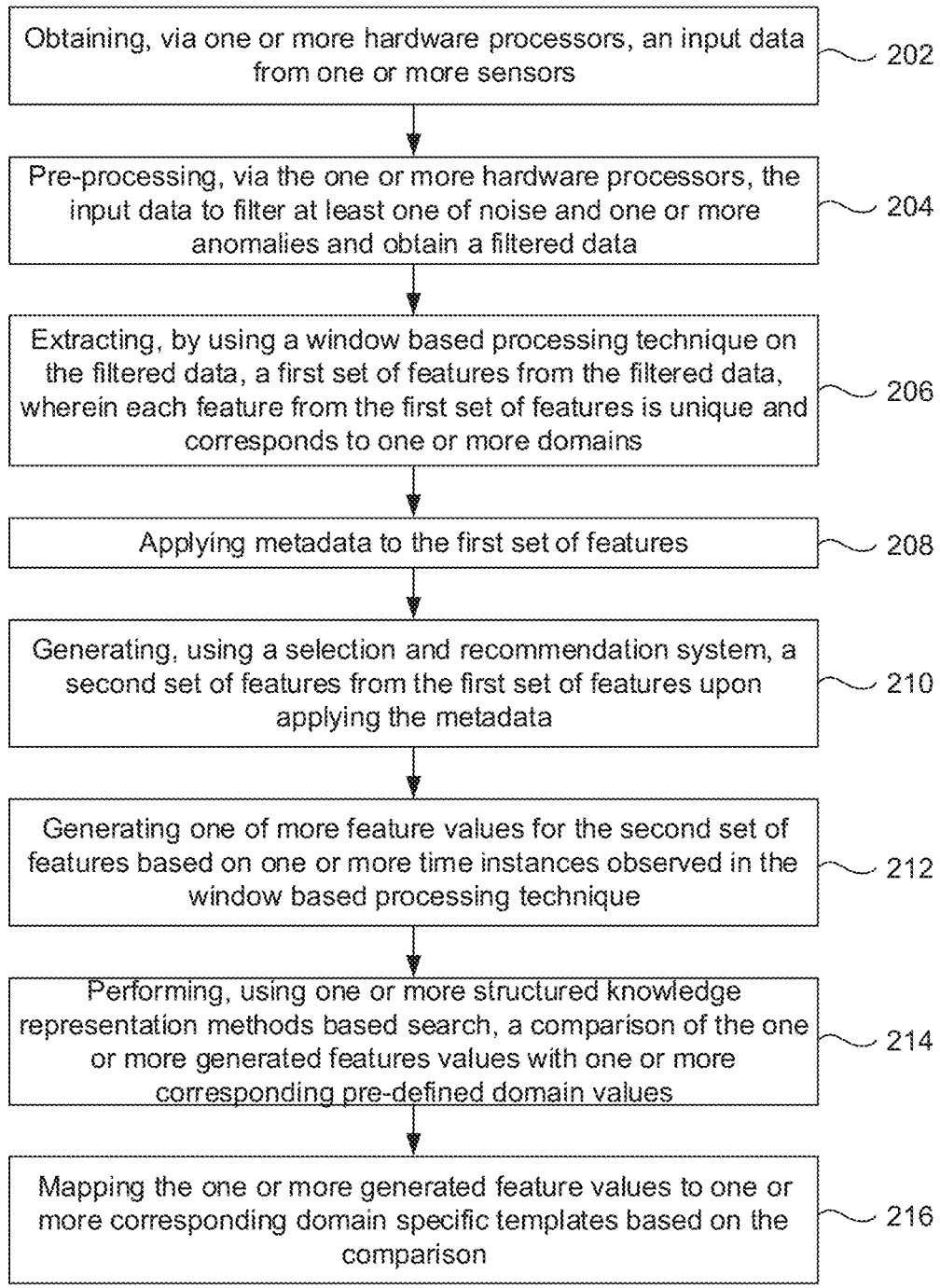
FIG. 2 illustrates an exemplary block diagram illustrating a method for features extraction from input data and interpretation thereof for recommendations using the system in accordance with an embodiment of the present disclosure.
Figure 3:
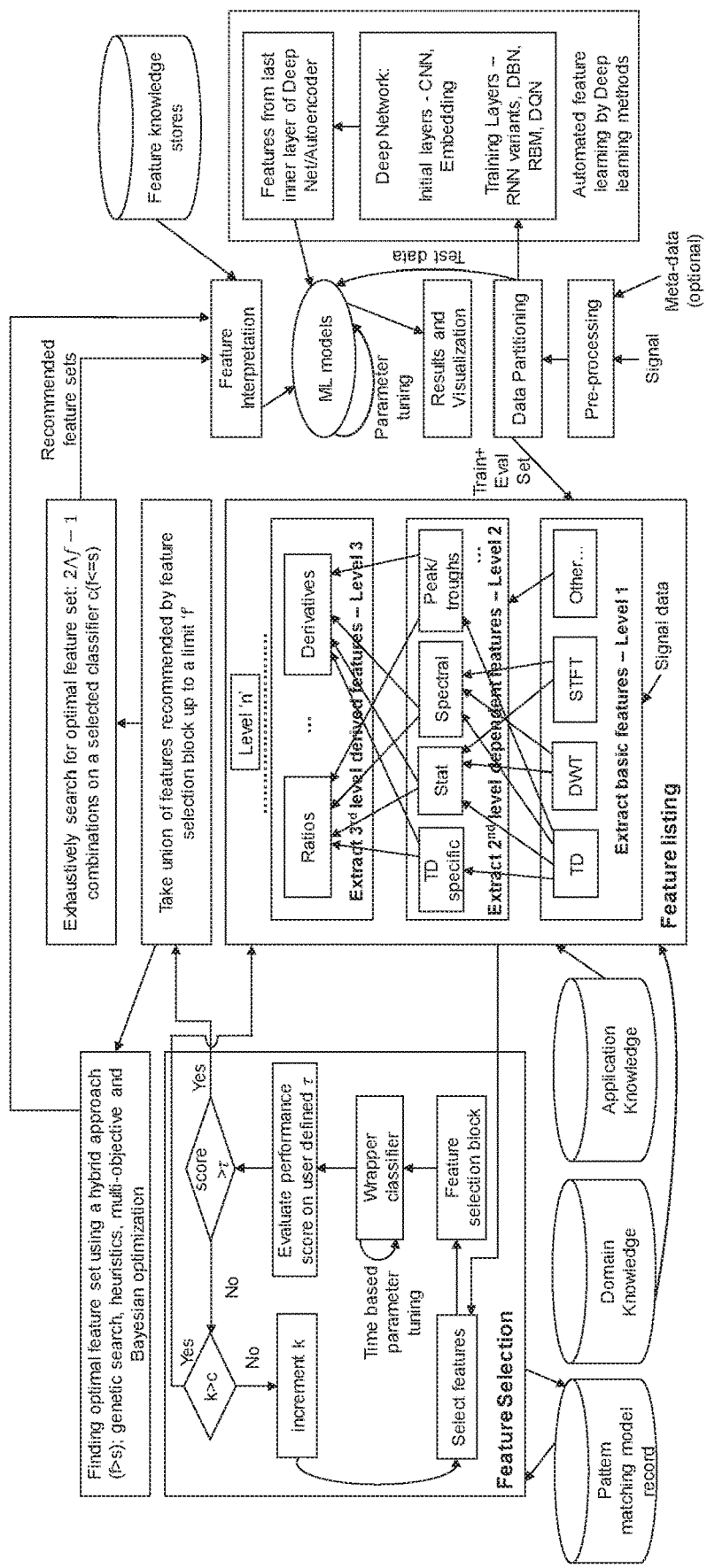
FIG. 3 illustrates an exemplary automated method for feature engineering based on Wide Learning Architecture in accordance with an embodiment of the present disclosure.

FIG. 2, with reference to FIG. 1, illustrates an exemplary block diagram illustrating a method for features extraction from input data and interpretation thereof for recommendations using the system 100 in accordance with an embodiment of the present disclosure. FIG. 3, with reference to FIGS. 1-2, illustrates an exemplary automated method for feature engineering based on Wide Learning Architecture in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram of FIG. 2, and the architecture of FIG. 3. In an embodiment of the present disclosure, at step 202, the one or more hardware processors 104 obtain an input signal from one or more sensors. In an embodiment of the present disclosure, at step 202, the one or more hardware processors 104 pre-processing the input data (e.g., input signal comprising data) to filter (e.g., using a finite impulse response (FIR) filter) at least one of noise and one or more anomalies and obtain a filtered data (e.g., a filtered signal). In an embodiment, the system 100 accepts a set of annotated input signal data. The signal data is obtained after a) standard pre-processing steps are executed and final outcome may comprise a matrix format with labels b) data is partitioned into Train and Test in multiple folds (e.g., usually 5). In an example embodiment, the system 100 automatically determines the number of folds depending on number of data instances available. The number of clusters were determined based on cluster quality metric namely Silhouette Coefficient. The data partitions were composed of proportionate distribution (as per number of folds) of cluster members among Train-Eval-Test sets. The performance (say accuracy) is reported on the hidden Test Set, while the rest is used for feature recommendation. The performance (say accuracy) is reported on the hidden Test Set, while the rest is used for feature recommendation. The performance metric can also be treated as a cost function of the form of a multi-objective optimization problem such as to satisfy an equation of form: operator can be any mathematical operation involving constants $$\text{min. or max.}$$
$$(\text{weight1*metric1}\{\text{operator}\}\text{weight2*metric2}\{\text{operator}\}\ldots)$$

The train data is passed to extract the features at various levels of feature extraction. The 'Eval' Set is used for classifier-in loop evaluation (wrapper method of feature selection) on obtained features derived from the Train set. The Classifiers used are an ensemble of Random Forest and linear and Gaussian kernels for Support Vector Machine (SVM) with time bounded parameter tuning. The intuition is that even using under-tuned models, good features reveal themselves.

In an embodiment of the present disclosure, at step 206, the one or more hardware processor extract, by using a window based processing technique on the filtered data, a first set of features from the filtered data, wherein each feature from the first set of features is unique and corresponds to one or more domains (and/or applications). In an embodiment, pre-defined number of samples taken at a time. That number 'n' can be selected either by heuristic and the input data characteristic or by applying some algorithm(s)/technique(s) for parameter optimization for example, grid search or may be some more sophisticated method can be used. In one typical realization on input data obtained as signal that size may be termed as a window. In an embodiment of the present disclosure, at step 208, the one or more hardware processors 104 apply metadata to the first set of features and generate, using a selection and recommendation system (stored the memory 102), a second set of features from the first set of features upon applying the metadata at step 210. In an embodiment, feature(s) are extracted analyzing a window size (or window frame) associated with each window applied using the window based processing technique and extracting, by using the analyzed window size, the features set associated with each window. In an embodiment, the window size is analysed based on a weighted aggregation of at least one of a domain specified window and a statistically applied window size. In an embodiment of the present disclosure, upon applying the window based processing technique, the system 100 identifies one or more duplicate features from each window and filters the identified one or more duplicate features from the features set (e.g., filters feature(s) from the first set and the second set of features).

Features of sensor data analytics can be classified in one or more types, for example, but are not limited to: (i) Time Domain features (TD) (ii) Fourier transformation based features/short-time Fourier transform (STFT) (iii) Discrete Wavelet transformation based features (DWT) and the like. So, at Level 1, basic features are extracted and passed on to Feature Selection Module. DWT requires input of a mother wavelet type as one of its parameters, but automated mother wavelet identification is a challenging problem. The appropriate mother wavelet for carrying out the Wavelet Transform is selected by comparing the input signal with a library of mother wavelets in terms of having maximum energy to entropy ratio. As the purpose of a feature is distinguish between two groups, so an alternative less error-prone distance base approach may also be applied by the system 100. Here, each mother wavelet's energy-entropy ratio is ranked and the one that has maximum distance to a set of training classes are added as a feature. In level 2, spectral, statistical, time domain based and peak-trough features are extracted. Level 3 includes different ratios and derivatives of the level 2 features. There can be 'n' number of levels in an examplary architecture, but each layer is logically separated based on hierarchy, domain knowledge and meta-data. Feature subsets are selected by iteratively applying a combination of two powerful feature selection techniques in the wrapper approach, for example, selection technique(s) may comprise minimum-redundancy maximum-relevancy (mRMR) technique and/or maximum relevance-maximum significance (MRMS) technique. These technique cover different aspects of feature selection. For instance, mRMR is classifier independent whereas MRMS is effective to reduce real valued noisy features which are likely to occur in sensor data. The system 100 is open to add more feature selectors as per need. The system 100 finds 2 feature sets of cardinality 'k' for a particular performance metric (such as accuracy, sensitivity, specificity): a) Fe1—that produces the highest metric in any fold of cross-validation b) Fe2—that is most consistent and performs well across all folds. The above step of feature selection is done hierarchically—if layer 1 does not produce expected results set by a user defined pre-set threshold $\tau$ or maximum possible value of a selected metric (say 1.0), then layer 2 (higher level features) is invoked, and so on. 'c' is a regularizer for 'k' and is dependent proportionately on the hardware capabilities of the experimentation system. As an example for a low-end desktop machine at this date, value of 'c' will be around 25. Post feature selection, an exhaustive search is done on the finalized 'f' features to find the ideal feature combination (best among $2^f-1$ subsets) for the task. FIG. 3, with reference to FIGS. 1-2, depicts generation of the second set of features by performing an exhaustive search for optimal features set. It has been shown that without applying brute-force, appropriate feature combination cannot be arrived with certainty. 's' is a regularizer for selection of exhaustive search and is slightly greater than similar functional 'c' (say 30 for low-end desktop machine at this date). For large 'f', a hybrid approach is applied to carry out the close to optimal feature selection. This is done by a combination of genetic search, heuristics and various optimization techniques such as Bayesian, Multi-objective, Ant-colony and is not limited in scope. This selected feature recommendation set is used for modeling using standard classifiers like Artificial Neural Network (ANN), SVM, Random Forest post parameter tuning based on standard techniques (such as grid search, random search) to derive results on the hidden Test Set, which stands for the actual system performance. The system 100 also has an option to use features derived by Deep Learning methods based, so that in case of feature interpretability is not needed. Recommended features from Wide Learning method and Deep Learning method can be combined on a weighted ranked basis to form a superior model for the specified task. The weights can be user specified, automatically learnt over running many data instances or domain specified. Feature ranking is based on performance in loop wrapper approach with both sets of features.

Figure 4:
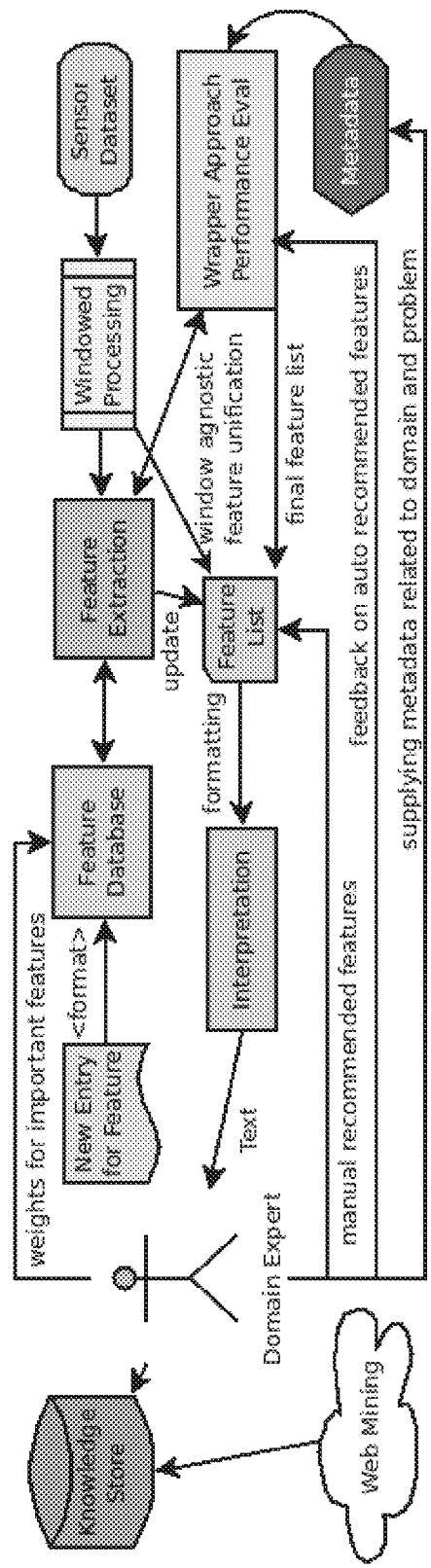
FIG. 4 is an exemplary block diagram depicting a feature interpretation module of the system of FIG. 1 in accordance with an embodiment of the present disclosure.

In an embodiment of the present disclosure, at step 212, the one or more hardware processors 104 generate one of more feature values for the second set of features based on one or more time instances observed in the window based processing technique (depicted in FIG. 4). In an embodiment of the present disclosure, at step 214, the one or more hardware processors 104 perform, based on a searching on structured knowledge representation methods such as for example, a knowledge graph search, a comparison of the one or more generated features values with one or more corresponding pre-defined domain values. In other words, the comparison of the one or more generated features values with one or more corresponding pre-defined domain values may be performed using one or more structured knowledge representation methods based search technique(s). In an embodiment of the present disclosure, at step 216, the one or more hardware processors 104 map the one or more generated feature values to one or more corresponding domain specific templates based on the comparison. A mapping table is iteratively maintained (in the memory 102) that stores the details of the steps through which each indexed feature value is being generated. The steps of each indexed value generation would typically include information regarding domain of transformation, transformation technique, location of the feature value in the transformed vector, and the like.

FIG. 4, with reference to FIG. 1 through FIG. 3, is an exemplary block diagram depicting a feature interpretation module of the system 100 of FIG. 1 in accordance with an embodiment of the present disclosure. Tables 1 and 2 show some of the sample recommended feature sets obtained for the classification task in dataset D1 (Nasa Bearing) with window size of 0.5 seconds and 1 second respectively:

TABLE 1

| S. No | | Frequency description |
|---|---|---|
| 1 | STFT | Frequency: 1851.1851 Hertz |
| | | Frequency: 1853.1853 Hertz |
| | | Frequency: 1153.1153 Hertz |
| | | Frequency: 1837.1837 Hertz |
| | | Frequency: 1845.1845 Hertz |
| 2 | | Difference of standard deviation values of windowed discrete wavelet transform (DWT) coefficients |
| 3 | | Standard deviation of STFT coefficients |
| 4 | | DWT Frequency (harmonic): 14.4991 Hz |

TABLE 2

| S. No | | Frequency description |
|---|---|---|
| 1 | STFT | Frequency: 1613.5807 Hertz |
| | | Frequency: 1829.5915 Hertz |
| | | Frequency: 1830.5915 Hertz |
| | | Frequency: 1837.5919 Hertz |
| 2 | | Kurtosis of DWT coefficients |
| 3 | | Standard deviation of DWT coefficients |
| 4 | | Standard deviation of STFT coefficients |
| 5 | | Zero crossing of DWT coefficients |
| 6 | | DWT Frequency (harmonic): 14.3701 Hz |

It can be seen that recommended features differ based on specified window size. The listing of features along with ranges of values obtained for the feature type aids the domain experts to map the obtained feature values to the physical world and the problem domain, so that deeper insights can be gained. Any feature set recommendation framework would recommend only the corresponding indices of the relevant features. Such feature identification mechanism is sufficient to trace back the recommended features from the generated feature pool. However, such a practice do not leave any room for further refinement of the recommendation through incorporation of domain expert's opinion. Also, when dealing with windowed processing, often the same features of different windows can get reported. So there needs to be means to identify features in different windows and compress them together instead of multiple window-wise reporting in cases of non-time variation dependent features. To address this issue, the proposed system 100 consists of a feature interpretation module as depicted in FIG. 4. The feature interpretation module accepts the recommended feature indices as input and returns any granular information that can be obtained by analyzing its step-by-step genesis process across windows of data processing. While feature values were derived to form input derived feature pool, a mapping table is iteratively maintained that stores the details of the steps through which each indexed feature value is being generated. The steps of each indexed value generation would typically include information regarding domain of transformation, transformation technique, location of the feature value in the transformed vector, etc. This is in contrast to a hard-coded repository of feature names tagged to unique identifiers, so that new feature extracting modules can be added and the meta-data update happens at the time of component plug-in. A format for feature extraction algorithm entry in database 108 is maintained, that include algorithm description, and value ranges which can aid in interpretation later. Another feature is that domain experts can add weights to those features which seem to have a physical world connection as per experience, so that related feature space can be explored. As an example, if domain experts tag spectral features as relevant for a specific application, more parameter tuning will be carried out on a variety of spectral features.

In this case, it can be predicted that bearing fault may arise because of all possible reasons other than the problem in Shaft frequency (features do not reveal that frequency as a differentiator), whereas Bearing Cage frequency seems to be the most causally related to failure. Hence, the reasons of failure can be suggested to the manufacturer by physical interpretation of the recommended features, and its mapping to the physical world for future defect prevention. Similar observations can be done in other applications such as health-care.

To accommodate the above, templates are maintained and data related to features and expected values for a field or domain or application is maintained in a Knowledge Graph (also referred hereinafter as knowledge search graph or knowledge base) which is either provided by domain and field experts, or by automated web mining or processing relevant text and media repositories. The knowledge base is maintained using semantic web technologies for easy extension and plug and play with ontologies and alignment to future proof technology. The template filled results are finally shown to user and feedback is passed back to the system 100 so as to judge whether the recommendation has been good or bad. Accordingly, weights for features are modified for future data analysis tasks.

Figure 5:
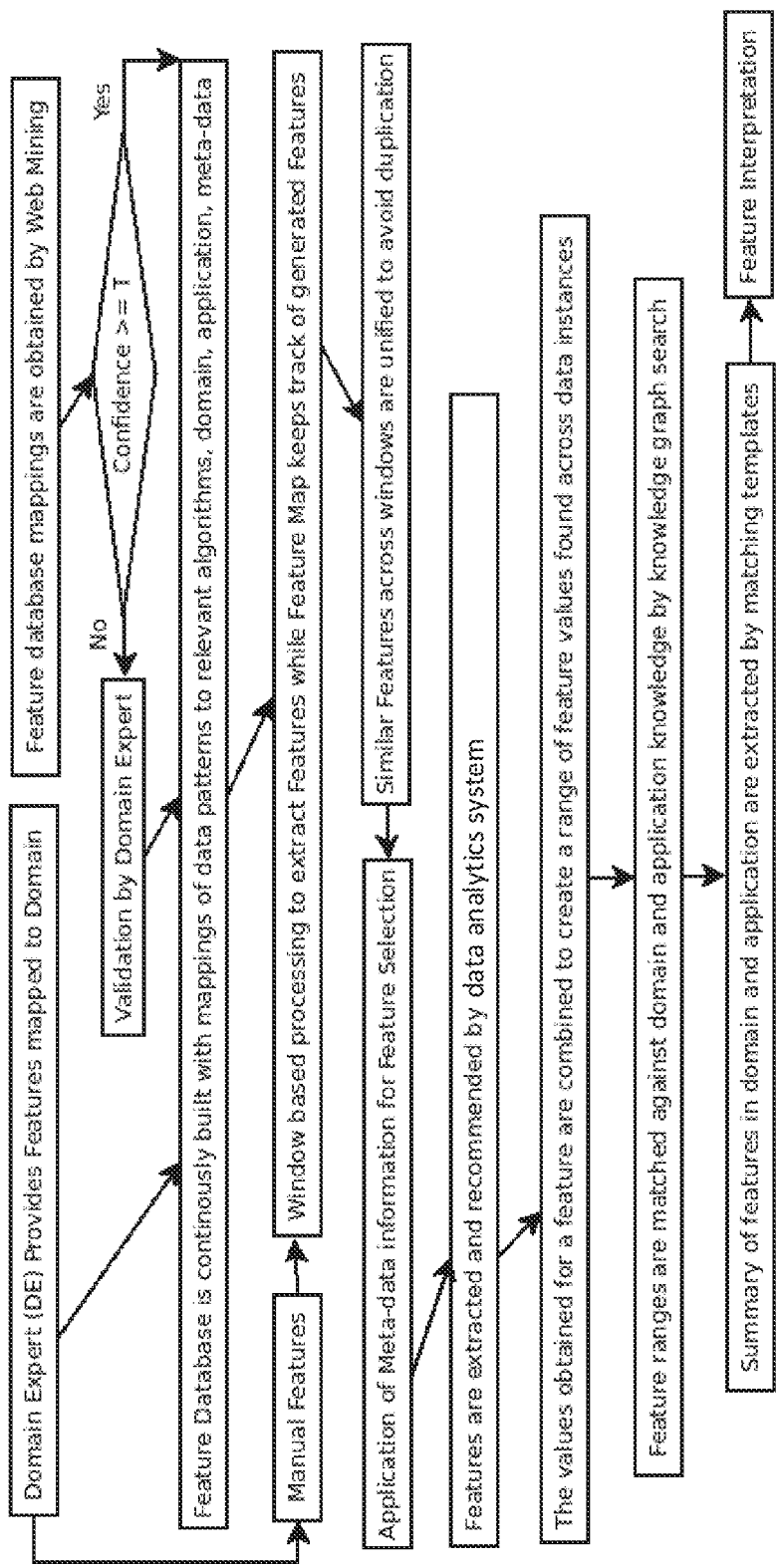
FIG. 5 depicts a flow diagram illustrating a method for feature interpretation using the system of FIG. 1 in accordance with an example embodiment of the present disclosure.

FIG. 5, with reference to FIGS. 1 through 4, depicts a flow diagram illustrating a method for feature interpretation using the system 100 of FIG. 1 in accordance with an example embodiment of the present disclosure. As discussed in above FIGS, domain expert(s) (also referred hereinafter as DE) provides features mapped to domain, and feature database mappings are obtained by web mining technique. Confidence score of each value/feature thereof is compared with a threshold say T. In an embodiment, if the confidence score is greater than or equal to the threshold T, the feature database (stored in the memory 102) is continually built (or updated) with mappings of data patterns to relevant technique(s) (or algorithms), domain(s), application(s), meta-data, and the like. In an embodiment, if the confidence score is less than or not equal to the threshold T, validation may be performed by the domain expert and the feature database (stored in the memory 102) is continually built with mappings of data patterns to relevant technique(s) (or algorithms), domain(s), application(s), meta-data, and the like. Window based processing is performed to extract features while feature map keeps track of generated features. Manual features from the domain expert may also be received as input to perform the window based processing on the extract features set. When the window based technique is applied, similar feature(s) across windows of time instances are unified to avoid duplication, and metadata is applied for feature selection. Further, features are extracted and recommended by the system 100 (also referred as a selection and recommendation system of FIG. 3 which depicts an overall architecture). The value(s) obtained for each feature are combined to create a range of feature values found across data instances (or time window instances). Feature ranges (or values) are compared against domain and application knowledge based on (or by) a knowledge graph search to determine one or more matches, if any. Furthermore, summary of features in domain and/or application are extracted by matching templates for feature interpretation.

Experimental Results

The experiment is performed on two popular and open 1-dimensional sensor signal data sets, the specification being tabulated in Table 3 and described as follows:

TABLE 3

| Dataset (D) | Total No. of instances | Class-0 No. of Instances | Class-1 No. of Instances | No. of samples | Sampling rate (Hz) |
| --- | --- | --- | --- | --- | --- |
| D1: NASA All | 3932 | 282 | 3650 | 20480 | 20,000 |
| D2: NASA Subset | 647 | 282 | 365 | 20480 | 20,000 |
| D3: Mobifall | 258 | 132 | 126 | 230 | 50 |

D1 and D2: NASA Bearing data set contains 4 bearing data instances each having 984 records, while the first bearing fails after 700th record among the total 984 recorded readings. The last two readings are not considered due to presence of missing values. So, 282 is obtained 'bad bearing' (class 0) records as ground truth for a class, while the rest 700 of the first bearing and 982 values each from rest 3 bearings that do not fail form the 'good bearing' class 1. To handle data unbalancing and see its effects, two datasets were created: D1: that contains the full dataset instances, D2: that contains a randomly selected small subset of the 'good bearing' instances along with all the 'bad bearing' instances. It was restricted to binary classification tasks to get comparable results.

D3: Mobifall3 data set is a popular fall detection data-set created by volunteers aged 22-47 years. Although the data-set contains various levels of activities, however the data-set was partitioned into 'fall' (class 0) and 'not fall' (class 1), in order to restrict to binary classification task.

Experimental Setup

Deep Learning based experiments has been carried out using Theano on a 8-core Intel 2.66 GHz machine having Nvidia GTX 1080 GPU. Multi-layer Perceptron (MLP), Convolutional Neural Network (CNN) and Long-Short Term Memory (LSTM) based Recurrent Neural Network were configured following standard rules of thumbs and principles to obtain results on the 3 datasets with grid search based hyper parameter optimization. Principal component analysis (PCA) is a statistical procedure that uses an orthogonal transformation to derive principal components representative of the features under consideration. Experiments were carried out on above datasets with both linear and Gaussian SVM kernels with varying number of principal components obtained post PCA.

Results and Analysis

Table 4 lists the obtained result for a dataset along with the corresponding effort for each of PCA (with SVM as classifier), MLP, CNN, LSTM, state-of-art (SoA) and proposed Wide method.

TABLE 4

| Dataset (D) | PCA | MLP | CNN | LSTM$ | MLP* | LSTM* | Manual SoA | WIDE |
| --- | --- | --- | --- | --- | --- | --- | --- | --- |
| D1. NASA All | 0.94 | 0.93 | 0.93 | 0.93 | 0.96 | 0.97 | 0.99 | 1.0 |
| D2. NASA Subset | 0.52 | 0.5 | 0.5 | 0.5 | 0.55 | 0.56 | 0.99 | 1.0 |
| D3. Mobifall | 0.51 | 0.44 | 0.44 | 0.44 | 0.44 | 0.44 | 0.99 | 0.98 |
| Approx. Effort in person-days unit for the task | D1. 2 D2. 2 D3. 1 | D1. 3 D2. 3 D3. 4 | D1. 5 D2. 5 D3. 7 | D1. 6 D2. 8 D3. 9 | D1. 4 D2. 4 D3. 4.2 | D1. 7 D2. 9 D3. 9.2 | D1. 30 D2. 30 D3. 90 | D1. 1 D2. 1 D3. 0.2 |
| Interpretable | No | No | No | No | Yes | Yes | Yes | Yes |

$output of CNN layers are fed to LSTM;

*performance measured on features extracted by the Wide method

From the above table(s) it is evident that PCA based methods (where features are not interpretable) are outperformed by Wide method. Deep Learning (DL) approaches were applied on both raw data as well as features recommended by proposed method. It is seen that DL based techniques fail when compared to SoA and the proposed Wide Learning method, probably because of less data instances. The two major problems with DL is that it needs a lot of data for training which is often not available for 1-D sensor signals ('bad' class) and there is no way to interpret the features for causal analysis. It was observed that DL techniques classify all the test instances into one class that can be found by calculating the ratio between classes of table 3 (apart from confusion matrix) for NASA bearing dataset D1 and D2. Another notable observation is that, in no instance, has classification performance on recommended features fallen in comparison with automated feature learning. The performance for Mobifall dataset is not at par in case of DL that can be attributed to the low number of input vectors for training the deep models. Hence, the proposed Wide Learning approach by the system 100 was found to be effective for the above cases with huge reduction of development time and at par performance.

Physical Interpretation

Traditionally feature selection method is a manual effort where a domain expert identifies some features using her/his domain expertise and experience; and then plot them for various class labels to conclude whether the features are relevant or not for a problem. In line with that the NASA Bearing data-set is selected here for interpretation analysis. Similar interpretation were also found in the other data set. The automated feature recommendation method predicted features at 14 Hz (DWT feature) harmonic space of the fundamental frequencies of the bearings rotating elements as reported below. Therefore the recommended features can be mapped to the physical world elements for further introspection and analysis by the in-loop domain expert. The bearing physics suggests fundamental frequencies as:
  a. Outer Race Frequency=236.4 Hz
  b. Inner Race Frequency=296.9 Hz
  c. Rolling Element Frequency=279.8 Hz
  d. Shaft Frequency=33.33 Hz
  e. Bearing Cage Frequency=14.7 Hz.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining (202), via one or more hardware processors, an input data from one or more sensors;
   pre-processing (204), via the one or more hardware processors, the input data to filter at least one of noise and one or more anomalies and obtain a filtered data;
   extracting (206), by using a window based processing technique on the filtered data, a first set of features from the filtered data, wherein each feature from the first set of features is unique and corresponds to one or more domains;
   applying (208) metadata to the first set of features;
   generating (210), using a selection and recommendation system, a second set of features from the first set of features upon applying the metadata;
   generating (212) one of more feature values for the second set of features based on one or more time instances observed in the window based processing technique;
   performing (214), using one or more structured knowledge representation methods based search, a comparison of the one or more generated features values with one or more corresponding pre-defined domain values; and
   mapping (216) the one or more generated feature values to one or more corresponding domain specific templates based on the comparison.

2. The processor implemented method of claim 1, wherein the step of extracting, by using a window based processing technique on the filtered data, a first set of features from the filtered data comprises:
   analyzing a window size associated with each window applied using the window based processing technique; and
   extracting, by using the analyzed window size, the first set of features associated with each window.

3. The processor implemented method of claim 2, wherein the window size is analysed based on a weighted aggregation of at least one of a domain specified window and a statistically identified window size.

4. The processor implemented method of claim 1, further comprising tuning the one or more feature values corresponding to each feature from the second set of features to determine performance of each feature in the one or more domains.

5. The processor implemented method of claim 1, further comprising upon applying the window based processing technique on the filtered data, identifying one or more duplicate features from each window; and filtering the one or more duplicate features from the first set of features.

6. A system (100), comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
   obtain an input data from one or more sensors;
   pre-process the input data to filter at least one of noise and one or more anomalies and obtain a filtered data;
   extract, by using a window based processing technique on the filtered data, a first set of features from the filtered data, wherein each feature from the first set of features is unique and corresponds to one or more domains;
   apply metadata to the first set of features;
   generate, using a selection and recommendation system, a second set of features from the first set of features upon applying the metadata;
   generate one of more feature values for the second set of features based on one or more time instances observed in the window based processing technique;
   perform, using one or more structured knowledge representation methods based search, a comparison of the one or more generated features values with one or more corresponding pre-defined domain values; and
   map the one or more generated feature values to one or more corresponding domain specific templates based on the comparison.

7. The system of claim 6, wherein the first set of features are extracted from the filtered data by:
   analyzing a window size associated with each window applied using the window based processing technique; and
   extracting, by using the analyzed window size, the first set of features associated with each window.

8. The system of claim 7, wherein the window size is analysed based on a weighted aggregation of at least one of a domain specified window and a statistically identified window size.

9. The system of claim 6, wherein the one or more hardware processors are further configured to tune the one or more feature values corresponding to each feature from the second set of features to determine performance of each feature in the one or more domains.

10. The system of claim 6, wherein upon the window based processing technique being applied on the filtered data, the one or more hardware processors are further configured to identify one or more duplicate features from each window, and filter the one or more duplicate features from the first set of features.

11. One or more non-transitory machine readable information storage mediums comprising one or more instructions which when executed by one or more hardware processors causes:
   obtaining, via the one or more hardware processors, an input data from one or more sensors;
   pre-processing, via the one or more hardware processors, the input data to filter at least one of noise and one or more anomalies and obtain a filtered data;
   extracting, by using a window based processing technique on the filtered data, a first set of features from the filtered data, wherein each feature from the first set of features is unique and corresponds to one or more domains;
   applying metadata to the first set of features;
   generating, using a selection and recommendation system, a second set of features from the first set of features upon applying the metadata;
   generating one of more feature values for the second set of features based on one or more time instances observed in the window based processing technique;
   performing, using one or more structured knowledge representation methods based search, a comparison of the one or more generated features values with one or more corresponding pre-defined domain values; and
   mapping the one or more generated feature values to one or more corresponding domain specific templates based on the comparison.

12. The one or more non-transitory machine readable information storage mediums of claim 11, wherein the step of extracting, by using a window based processing technique on the filtered data, a first set of features from the filtered data comprises:
- analyzing a window size associated with each window applied using the window based processing technique; and
- extracting, by using the analyzed window size, the first set of features associated with each window.

13. The one or more non-transitory machine readable information storage mediums of claim 12, wherein the window size is analysed based on a weighted aggregation of at least one of a domain specified window and a statistically identified window size.

14. The one or more non-transitory machine readable information storage mediums of claim 11, wherein the one or more instructions further cause tuning the one or more feature values corresponding to each feature from the second set of features to determine performance of each feature in the one or more domains.

15. The one or more non-transitory machine readable information storage mediums of claim 11, wherein the one or more instructions further cause
- upon applying the window based processing technique on the filtered data, identifying one or more duplicate features from each window; and
- filtering the one or more duplicate features from the first set of features.

* * * * *